Figure 1:
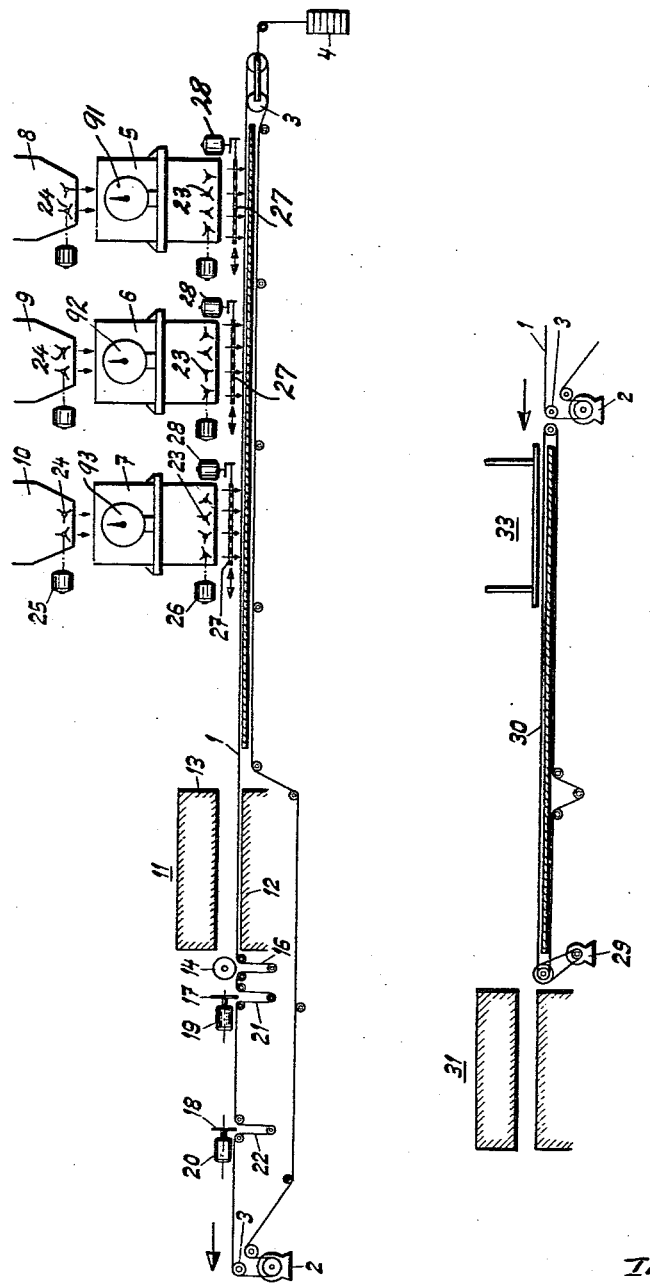

INVENTOR:
HANS KAISER

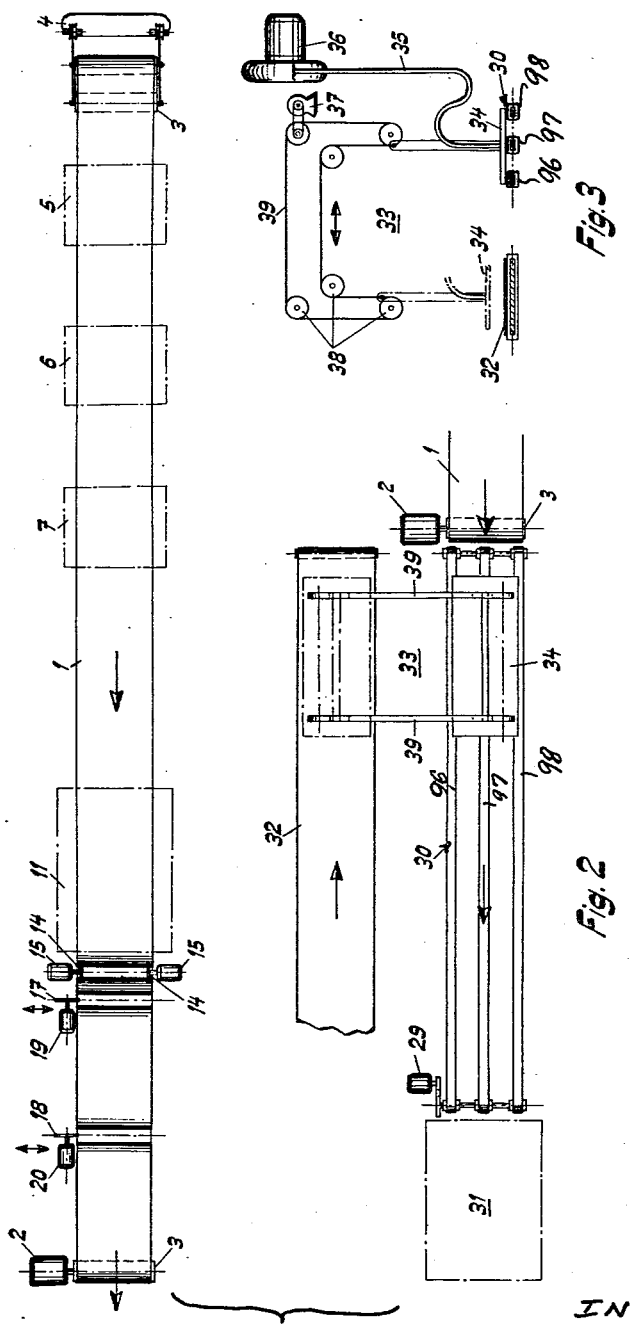

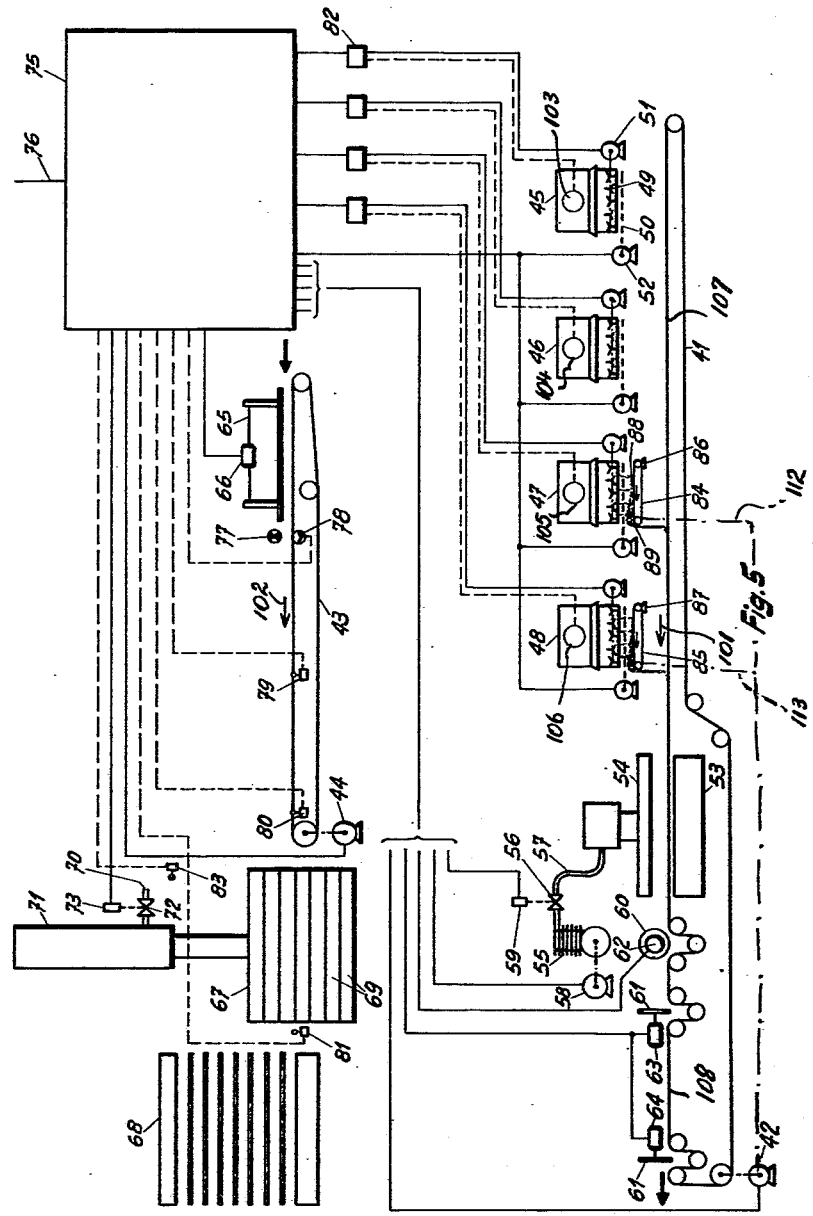

1

3,051,219
SYSTEM FOR CONTINUOUSLY PREPARING PRE-DIMENSIONED BODIES WITH LAYER FORMATIONS
Hans Kaiser, Bern, Switzerland, assignor to Interwood AG., Zug, Switzerland
Filed Nov. 1, 1957, Ser. No. 693,982
Claims priority, application Switzerland Nov. 2, 1956
3 Claims. (Cl. 156—375)

The present invention refers to improvements in or relating to a process and plant for continuously manufacturing plate-shaped bodies from comminuted fibrous material inherently containing binders or having binders thereto.

It is one of the objects of the present invention to provide means affording accurate and equal distribution of fibrous material in layer formation with subsequent operational steps to bring about a final substantially cake-shaped body of uniform size and dimensions positioned on a metal sheet.

It is another object of the present invention to provide means rendering the possibility of first quantitatively determining the respective comminuted or chip materials and thereafter to dispose said materials in a predetermined fashion for finally obtaining a layer formation which may assume thickness and other dimensions as required.

Still a further object of the present invention is to provide means affording the transportation of stacked strata of chip or like materials to presses and other machine tools so as to continuously bring about the manufacture of substantially uniform and evenly shaped blanks or similar bodies.

Still a further object of the present invention is to provide means responding to continuous and well timed procedural steps in the manufacture of the aforesaid blanks or layer formations whereby the supply of starting materials of the same or different texture and the discharge of the finished blanks will be performed substantially without any loss of time, in a highly economical manner and without the necessity of employing skilled labor, the maintenance of the plant requiring relatively little surveillance.

The material used may be composed of fibers such as wood shavings or wood dust of any nature, straw, chaff or chopped straw, cane or reed or similar materials suitable for the manufacture of cellulose or wooden plate shapes made from artificial or synthetic chips or shavings. The invention has as one of its objects to more economically and rationally carry out a process for manufacturing such plate-shaped forms.

In carrying out the process according to the invention the fibrous material is deposited by means of vibrating feed devices in predetermined quantity and fed onto an endless intermittently movable conveyor band. The material is prepressed on the conveyor band into a cake or other suitable blank or briquette whereafter the blank or briquette of predetermined mass is preshaped and subsequently conducted onto another conveyor means for the purpose of finishing the product.

The apparatus for carrying out this process is characterized according to the invention by a first conveyor device which includes an endless motor-driven conveyor band which is guided by rollers and tensioned by means of weights, and is further characterized by at least one vibrating feed device which is disposed above the conveyor band for feeding fibrous material.

Furthermore, the conveyor band passes to a preliminary press between a press ram and the support therefor for the purpose of pre-pressing a blank or similar body in which the fibrous material is pre-pressed or shaped. Additionally, longitudinal circular saws are arranged at opposite sides of the conveyor band and are stationary with respect to the latter so that during the movement of the conveyor band the pre-pressed cake is cut or sawed off to assume a predetermined width. By subsequent transverse circular saws which act on the pre-pressed cake blank during standstill of the conveyor band in crosswise direction of the latter, the blank is cut to predetermined length. A second conveyor band is provided for the reception and further travel of sheet metal with the pre-shaped or pre-cut cake disposed thereon.

The aforesaid other objects of the invention will become further apparent from the following detailed description, reference being made to the accompanying drawings showing preferred embodiment of the invention.

Figure 4:
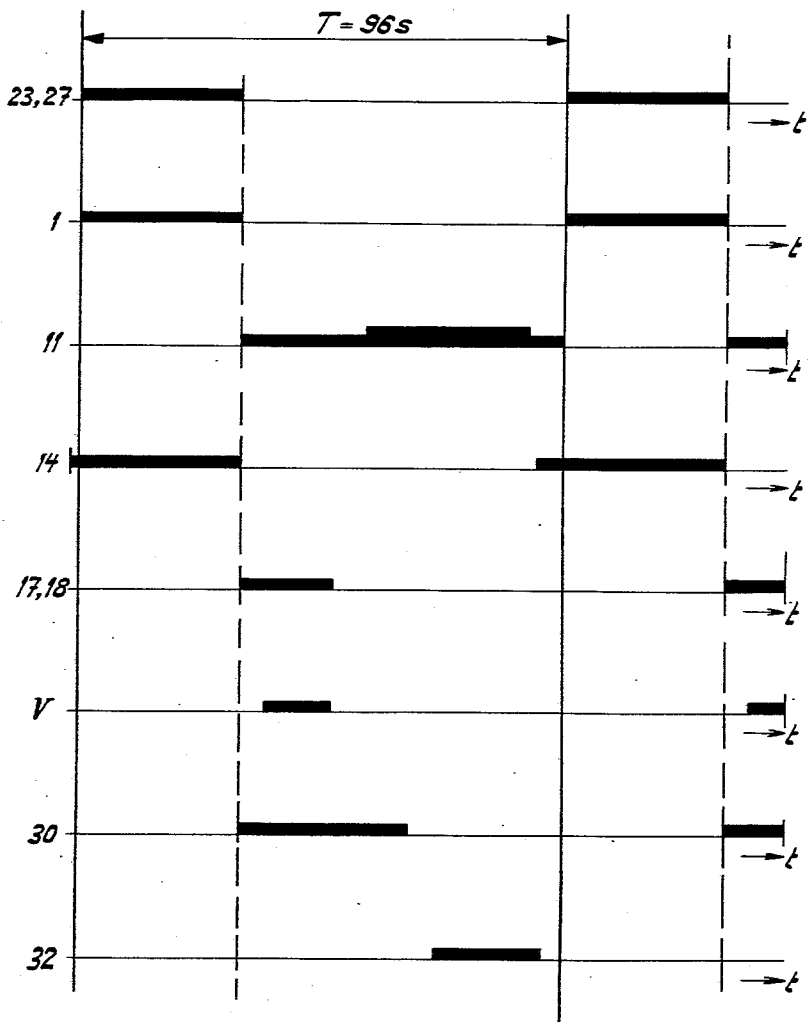

In the drawings:
FIG. 1 is a schematic side elevation view, partly in section, of the invention;
FIG. 2 is a partial top plan view of the apparatus showing particularly the construction of the conveyors;
FIG. 3 is a schematic elevational view illustrating the device for the supply of sheet metal trays;
FIG. 4 is a graph showing the stages of operation of the parts of the invention; and
FIG. 5 shows a further embodiment of the invention which essentially corresponds to the form shown in FIGS. 1 to 3 and in which electrical equipment for the control of the automatic performance of the process of manufacture is schematically shown.

Referring now more particularly to the drawings wherein like reference numerals designate similar parts throughout the various views, there is indicated in FIG. 1 a first conveyor having an entrance conveyor band 1 of elastic material, for example rubber, synthetic plastics, rubberized cloth, and the like which is driven by an electric motor 2 and over rollers 3. A suitable counterweight 4 tensions the endless conveyor band 1. Above conveyor band 1 there are successively arranged three vibrating feed devices 5, 6 and 7 which are disposed at predetermined distances from each other and which contain fibrous material which is embued or otherwise mixed with a suitable binder such as urea-formaldehyde glue, cellulose adhesives, etc. The fibrous material may be wood shavings or chips, so called cut artificial chips which were previously received from silos 8, 9 and 10. The vibrating feed devices distribute the fibrous material onto the conveyor band 1 in a uniform manner. The number of the vibrating feed devices which will become effective or are set in motion depend upon the number of layers or strata of fibrous material to be discharged. A part of the vibrating feeding devices may also contain a different chip material than contained in the remaining devices.

Also the degree of fineness of the material in the respective vibrating feed devices may be different as is necessary for the production of differently composed layers, for instance the covering or intermediary layer. The material selected for the layers may be sieved off preferably from chips as such comes from crushing mills and in accordance with the chippability of the respective cutting tool forming the chips.

Disposed subsequent to the vibrating feed devices and in the direction of the movement of the conveyor there is arranged a preliminary or auxiliary press for pre-pressing the layers of chip material into a cake shaped blank. The conveyor 1 extends between the support 12 and the press die 13 and is intermittently arrested therebetween.

There are arranged at both length sides of the conveyor band 1 circular saws 14 which are stationary and extend longitudinally with respect to the conveyor band. These saws 14 are driven by means of an electric motor 15 while the movement of the conveyor band assures that the prepressed blank or briquette is cut to assume a predetermined width. In order to avoid the path of the circular saws the conveyor band 1 is deviated to form a loop which is downwardly directed.

Thereafter, two transversely extending circular saws 17 and 18 are arranged in spaced apart relation to each other. The saws 17 and 18 function to cut, during standstill of the conveyor band, the prepressed cake transversely to the direction of movement of the conveyor band in order to precut the blank to a predetermined length. Electric motors 19 and 20 serve to drive circular saws 17 and 18 cutting in transverse direction to the movement of the conveyor. The circular saws 17 and 18 together with their drive motors are disposed on a pedestal or frame (not shown) which may be displaced lengthwise of the conveyor band and which mount also the feed drive for the circular saws 17 and 18. Deviation rollers are also journaled on the displaceable frame so that the conveyor band 1 is guided at the location of cutting operation to produce a gap in which the circular saws perform their cutting operations by providing loops 21 and 22.

The vibrating feed devices 5, 6 and 7 are also equipped with scales 91, 92 and 93 in order to control the discharge of the chip material at the discharge opening in which there are disposed rotary spiders or augers 23.

At the discharge opening of the silos 8, 9 and 10 are also disposed for the same purpose augers 24 for quantitatively dispensing material to be worked upon. These spiders 23 and 24 are separately driven by means of electro motors 25 and 26, respectively. Below the vibrating feed devices 5, 6 and 7 are arranged vibratory sieves 27 in order to uniformly distribute the discharged chip material onto the conveyor band 1, the drive thereof being performed by electric motors 28. It is to be understood that instead of one, several sieves or screens for each feed or discharge station may be provided.

It is of advantage to arrange the feed installation so that per time unit of the discharge, chip material coming from the oscillating feed devices may be regulated. This can be achieved, for instance, by changing the angular velocity or the angle of the augers 23 with respect to each other. Control may be attained, for example by the number of revolutions of the drive motors 26 dependent upon the difference between the required quantity of the chip material and the quantity which is in fact prevailing in the respective oscillatory feed mechanism whereas on the other hand the angular velocity of the spiders or augers depend upon the number of revolutions of the drive motors.

It is further of advantage to provide means to stop the discharge of the chip material from the oscillatory feed mechanisms, for instance by arresting the augers 23 which is achieved as soon as the filling of the feed mechanism is at a predetermined weight. If the feed devices are not filled within a predetermined time unit, a signal device may be provided to attract the attention of the operator.

The second conveyor means directly adjacent the first conveyor means includes an electric motor 29 which drives a conveyor 30 including three spaced belts 96, 97 and 98, respectively which deliver the deposited and preshaped cakes onto delivery trays and finally to a heated press. The heated press may be a multi-layer or plate press of known construction.

In order to feed and supply the latter there is arranged according to the invention a particular feed mechanism (not shown). The speed of the conveyor 30 may be preferably two to four times greater than that of the conveyor band 1. Laterally of conveyor 30 there is arranged a further conveyor band 32 for supplying and conveying the feed trays from which the latter are lifted by means of a pneumatic hoist 33 and then transferred onto the conveyor belt 30 for receiving the prepressed and preshaped cakes.

The pneumatic hoist or lifting means is schematically illustrated in FIG. 3. This device includes a suction plate 34 which is connected via conduits 35 with a suitable pump 36. On a frame (not shown) which bridges the conveyor 30 and conveyor band 32 there are arranged endless lifting and displacement bands 39 which are driven by means of electric motor 37 over rollers 38. These endless lifting and transmitting bands 39 are so arranged that the suction plate 34 is lifted thereby so that the latter can be moved in reciprocatory motion in the direction indicated by the two conveyor devices 30 and 32 for deposit thereon.

The automatic plant is operated in the following manner:

The conveyor band 1 and the conveyor 30 are driven intermittently and are moved alternately with respect to each other. As soon as the quantities of the chip material required for the vibrating feed devices 5, 6 and 7 have reached the predetermined weight, the conveyor band 1 is put in motion. Electric motor 2 will be switched to an "on" position directly by means of contacts which are controlled by the scales 91, 92 and 93 of the feed system. Simultaneously the augers 23 are rotated and actuate the discharge openings of the feed devices and also the oscillating screens 27. The drive motors 26 and 28 thereof are also operated by means of the scale control switches (not shown).

The feed system including the vibrating feed devices produce on the conveyor band 1 a stratum consisting of three equal layers of fibrous material to which a binder has been supplied. Of course, it is possible to adjust the feed devices for feeding unequal quantities of material. When passing through press 11 the layers forming a blank are compressed and during the movement of the conveyor band the circular saws 14 work in lengthwise direction and cut off from the blank the prepressed cake or body coming from the auxiliary press 11. Thus a predetermined width is obtained for the prepressed or molded blank. Further on at the end of the conveyor band 1 the predetermined prepressed cakes are moved onto the conveyor 30 which has been stopped and on which the feed trays are positioned.

After each tray has been charged with its respective cake the conveyor band 1 is brought to a standstill automatically by electrical means such as photoelectric cells (not shown). The length of the path which is described by the conveyor band 1 during its movement is approximately equal to the length of a preshaped cake including the waste which might be caused when cutting off from blanks two adjacent cakes.

At the moment of standstill of the conveyor band 1 the following operational steps are initiated by the automatic control system:

The electric motors 26 and 28 are cut off and thus the augers 23 and the oscillatory screens 27 are arrested so that further discharge will be interrupted. The augers 24 which are still rotated at the discharge opening of the supply silos 8, 9 and 10 act to supplement and to fill up the vibrating feed devices. The preliminary or auxiliary press 11 starts to act and presses ram 13 against the blank which remains on the conveyor band to form the prepressed blank. Thereafter the crosswise acting circular saws 17 and 18 and their feed mechanisms are started whereby the prepressed blank discharge from the press 11 is cut to assume a desired length. At the same moment, the conveyor 30 is put into motion which conducts the cake with increased speed to the plate press 31. As soon as the cake together with its support tray leaves the conveyor belt 30 a contact switch operated by means of a feeler drives motor 29 to an "off" position so that conveyor 30 will be arrested. In the meantime the suction plate device 34 of the hoist 33 takes up an empty tray which has been brought on by the conveyor belt 32 and deposits such tray onto the conveyor 30 which is still at a standstill. The oscillating or vibrating feed mechanisms 5, 6 and 7 are meanwhile being filled up and the operation starts over again.

FIG. 4 is a graph or chart indicating by way of example the performance of the steps in timed relation whereby the numbers at the start of the time, abscissae t, have reference to the numerals of the respective parts of the invention heretofore described and shown in FIGS. 1 through 3. In this graph there is also indicated the time consumed during the advance V for the circular saws 17, 18 acting in crosswise direction. The duration of the pressing operation of the auxiliary press 11 is evident from the graph by a particular bold marking of time. As an example for the duration of the complete machine performance as hereinabove set forth T is equal to 96 seconds.

In normal operation the feed device for the molding press is lifted about one step after delivery of one pressed body or cake so as to take up the succeeding cake. On the conveyor 30 there is always arranged in such operation a single cake. During the time, however, in which the charging device is completely loaded the conveyor 30 will be moved ahead during the respective operational phases for about one length of pressed body or cake. Thus the conveyor belt 30 may, for instance, take up altogether three successive cakes.

The necessary premature arrest of the conveyor 30 which will be actuated by contacts with feelers which are arranged lengthwise of the conveyor 30 will be operated as soon as a feed tray abuts against the feelers or feeler levers. These intermediary contacts remain inoperative during the normal operation only when the supply device is completely taken up and the cakes are accumulated on the conveyor 30 causing the feed arrangement when arriving at its upper end or limit position to trip a switch which causes the change of operation.

The waste remaining on the conveyor band 1 and located between prepressed bodies is removed by an exhaust (not shown) which is preferably arranged at the location of transition between the conveyor band 1 and the conveyor 30. The waste is then refed via the median silo into the respective oscillatory feed device.

The plant according to FIG. 5 comprises two successive conveyor means namely conveyor band 41 driven by electric motor 42 and conveyor 43 in driving relation with drive motor 44. The direction of movement of these conveyor means is indicated through respective arrows 101 and 102.

The feed devices 45, 46, 47 and 48 are provided with scale devices 103, 104, 105 and 106 and are superpositioned with respect to the first part 107 of the conveyor band 41. These feed devices are equipped with augers or spiders 49 and each is further equipped with an oscillatory screen 50 for the uniform discharge of the material to be worked upon. The electric motors for driving the augers 49 and screens 50 are indicated respectively by numerals 51 and 52. There is provided a hydraulically actuated preliminary or auxiliary press which is supported on table 53 and includes a press ram 54 whose cylinder is connected to a conduit 57 which contains a valve 56 through which pressure fluid is regulated coming from compressor 55.

The compressor 55 is driven by an electric motor 58 and in order to operate the valve 56 an electromagnetic actuating system 59 is employed. The longitudinally movable circular saw or saws 60 and the transversely movable circular saws 61 together with their respective drive motors 62, 63 and 64 are mounted on the portion 108 of the conveyor band 41.

At the beginning of the subsequently arranged conveyor 43 which follows the arrangement of conveyor b and 41 there is arranged a lifting device 65 which serves to supply delivery trays, and includes a drive motor 66.

At the end of conveyor belt 43 there is disposed a hydraulic-actuated device 67 which effectuates the loading of a heating press 68 which is provided with a number of drawers 69 into which the respective delivery trays carrying the preshaped and prepressed bodies are successively inserted, whereby the loading device 67 is vertically moved after each insertion step by step to fill the drawers and is raised to the respective height of the drawer to be filled.

In the pressure fluid conduit 70 there is arranged a valve 72 which leads to the drive cylinder 71 of the loading device 67 whereby the aforesaid valve 72 is actuated by an electromagnetic drive system indicated at 73.

The timed sequence of the respective procedural steps is controlled by means of a program-switch installation indicated schematically at 75 to which electric power may be supplied via a conduit 76 and from which the various drive motors are being supplied through the respective conduits shown in solid lines. The aforesaid switch installation 75 contains several electronically controlled time relays (not shown) which are influenced by means of the light of a lamp 77 cooperating with a photoelectric cell 78 and several limit switches 79, 80, 81 which are arranged adjacent the loading device 67 and through which the transportation of the respective bodies are influenced as indicated by the control leads shown in dotted lines.

The number of revolutions of the electric motors 51 which actuate the respective spiders or augers 49 which control the discharge of the goods to be distributed will be controlled by means of electronic regulating devices 82 which, in turn, are controlled or regulated by the weighing or scale systems 103 through 106 incorporated in the respective oscillatory feed devices 45 to 48.

The automatic operation of the plant as now described is as follows:

The conveyor band 41 and the conveyor 43 are intermittently operated in a manner similar as described in connection with the plant shown in FIGS. 1 through 3 and move alternately respectively. The conveyor band 41 is placed in operation by means of a time relay of the switch installation 75 which also switches on electric motor 42. Simultaneously the spiders 49 and the oscillatory screens 50 of the delivery devices 45 to 48 are actuated via drive motors 51 and 52 and the respective time relays coordinated thereto. The discharge devices produce subsequently onto the conveyor band 41 a blank consisting of four layers substantially of uniform height consisting of respective fibrous material, which may be the same or different from each other and imbued or prepared with a respective binder substance.

During the movement of the conveyor band 41 the lengthwise actuating circular saws 60 are then agitated and cut off the waste from the prepressed bodies passed from the preliminary press to partially shape these bodies to a predetermined width. Simultaneously the prepressed blank which is disposed at the end of the conveyor band 41 will be moved onto a prearranged delivery tray which rests on the conveyor belt 43. After the delivery tray has completely received the advanced prepressed precut blank the photo cells 78 become effective and respond in that the respective ray for the photoelectric cells will be interrupted for sufficiently long time by the prepressed body. Photo cell 78 thus acts on the switching installation 75, so that the conveyor band 41 will come to a standstill. The length of the path which has been described by the conveyor band 41 during its movement is also equal to the length of a predetermined prepressed blank with consideration of the waste material which will accumulate after cutting operations between two successive bodies. At the moment of the standstill of the conveyor band 41 the following automatic control in the subsequent procedural steps will be initiated:

The electric motors 51 and 52 will be switched off and thus the spiders 49 and the oscillatory screens 50 will be arrested so that the further delivery action for the material will be interrupted. The preliminary press is then actuated due to the operation of the valve 56 and presses the blank which now appears below the press ram 54 and is finally pressed onto the conveyor band. Besides this the drive motors 63, 64 of the transversely acting circular saws 61 and their respective feed means (not shown) will be started so that the pressed blank coming from the preliminary press will be cut off to its predetermined length. Finally at the same moment the conveyor belt 43 is put in operation which delivers the previously deposited blank at elevated speed into the loading device 67 until the loaded delivery tray reaches the limit switch 81 and thus automatically causes the standstill of the conveyor belt 43. The lifting or hoist device 65 then delivers an empty delivery tray onto the conveyor belt 43 which at this instant has been stopped. In the meantime the delivery devices 45 to 48 have been filled up again and the operation starts over again upon a lapse of the time interval set for the respective time relays.

During the interruption in material delivery the contents remaining in the vibratory feed devices are checked in regard to their weights. If the discharge was too much or too little the layer formation was consequently too thick or too thin and the feed devices are then adjusted and regulated for the subsequent discharge operation by altering the number of revolutions of the motors 51. If during the time limit to be used for regulation of the supply of the required weight of material has not been attained then the further operation will be interrupted and an alarm signal will be released. Upon actuation of a push button (not shown) the filling up of the respective feed devices may then be completed and thereby the taking out of service or work stoppage of the apparatus will be eliminated.

During the normal operation the delivery or loading device 67 will be moved step by step in accordance with the receipt or loading of a blank in order to enable a successive blank to be received by the loading device 67. One blank is always placed on the conveyor belt 43 in such state of operation. During the time, however, when the loading device 67 is completely charged the conveyor belt 43 will then be advanced in the respective operational phase substantially a distance equal to the length of a single blank.

In such case the conveyor belt 43 may take up successively altogether three blanks. The standstill position of the conveyor belt 43 which for this purpose has to be achieved prematurely will be effectuated by the limit switches 79 and 80 which are operated when the respective delivery trays are advanced. These limit switches, however, are ineffective during normal operation; only when the loading device 67 is completely loaded and the layer formations are to be supplied onto the conveyor belt 43 will the loading device 67 when reaching its uppermost end position actuate a limit switch 83 which causes the change in the operational procedure and program.

The supply and accumulation of the delivery trays serve the purpose of adapting the irregular mode of movement for the charge of the heating press in accordance with the periodical movement of operation which occurs at the delivery.

The augers or spiders 23 or 49 and the oscillatory screens or sieves 27 or 50 according to the aforesaid embodiments of the invention serve the purpose to substantially equally distribute the discharge material onto the conveyor bands 1 or 41, as the case may be.

In order to obtain uniform plates or homogeneous composition and of equal thickness throughout the entire cross-section and length, the invention is adapted to achieve a particularly uniform distribution of the fibrous material onto the conveyor bands 1 and 41, respectively.

A considerable improvement may be obtained due to the fact that between individual delivery devices besides the main conveyor band 1 or 41, an additional conveyor band 84 may be arranged which is moved in the same manner and direction as the main conveyor band. The fibrous material passing through the oscillatory screen means, therefore, arrives first at the additional or auxiliary conveyor bands and is then discharged from the latter onto the main conveyor band. These auxiliary conveyor bands are schematically shown in FIG. 5 below the delivery devices 47 and 48 only and are indicated by numerals 84 and 85 whose drive is effectuated by electric motors 86 and 87 which are controlled by the same time relay of the switch installation 75 which also regulates the electric motor 42 to drive the conveyor band 41 so that the simultaneous movement of the conveyor band 41 as well as of the auxiliary conveyor bands 84 and 85 will be attained. It is also possible and sometimes of advantage to drive the auxiliary conveyor bands 84 and 85 via transfer means, indicated schematically at 112 and 113 from electric motor 42.

The chip material 88 which arrives during the movement of conveyor band 41 from the delivery devices through the spiders 49 onto the oscillatory screens 50 no longer arrives directly on the conveyor band 41 but first is directed onto the additional conveyor bands 84 and 85 so that there is formed at the discharge end thereof a substantially equally high and continuous layer 89 formed from chip material. Consequently, the latter is delivered at equal quantities from the additional conveyor bands 84 and 85 onto the main conveyor band 41.

In FIG. 5 there is shown for the sake of simplicity an auxiliary conveyor band 84 below the feed device 47 and an additional conveyor band 85 below feed device 48. Homogeneous plates, however, require in all strata the highest possible degree of uniformity and evenness, so that it is desirable to subordinate or coordinate to each delivery device a respective additional or auxiliary conveyor band.

A further improvement in the equal distribution of fibrous material strata onto the conveyor band may also be obtained by positioning the conveyor bands 84 and 85 adjacent the oscillatory screen means whereby the latter serve as scrapers or equalizers for the layer formation. Thus it will be ensured that the layer of chip material which is accumulated at the discharge end of the respective conveyors will always show and indicate a layer of equal height.

It is also possible to adjust the distance between the auxiliary conveyor bands 84 and 85 and the oscillatory screen means, for instance by displacing the latter or the additional conveyor bands 84 and 85 or both relative to each other with regulating or adjusting means well known per se. Through these possibilities and circumstances the quantity of the fibrous material arriving on the main conveyor band 41 may also be somewhat regulated and quantitively adjusted without regard to the movements of the spiders 49.

Thus it can be seen that there has been provided an apparatus for manufacturing cake-shaped bodies from comminuted fibrous materials including a binder comprising conveyor means, a plurality of feed devices disposed above and in parallel relation to the conveyor means for successively feeding comminuted material in layer formation. Each of the feed devices includes a silo with auger means in each silo for delivering comminuted material from the silo, scale means for receiving material from said silo and including further auger means for delivering a measured amount of material from said scale means, and a vibrating sieve disposed between said scale means and said conveyor means.

Further, there is provided means for pressing the superposed layers into a blank as well as saws for shaping the blank. The conveyor means includes a first endless belt conveyor. There is a second endless belt conveyor disposed in longitudinal alignment with said first conveyor, a third conveyor for delivering metal sheets parallel to said second conveyor, and means positioned above said second conveyor and said third conveyor for lifting the metal sheets off the third conveyor and depositing the sheets onto the second conveyor.

Various changes and modifications may be made with-

Having thus described the invention, what is claimed as new and desired to be secured by Letters Patent, is:

1. A device for forming accurately trimmed plate-shaped bodies from fiber materials having a binder mixed therewith comprising a continuous endless belt flexible conveyor, roller guide means along the length of said conveyor disposed along an elongated feed path and extending in a direction downwardly away from and upwardly back to said feed path at at least one location to form a loop with an opening being defined thereby in said feed path of shorter extent than the length of the body being formed by an amount to insure movement of the body on said conveyor over the loop opening, means for directing fibrous materials and a binder in a layer onto said conveyor as said conveyor is moved, said means being arranged at at least one location, means for intermittently moving said conveyor, pressing means disposed along the length of said conveyor in a position permitting passage of said conveyor with the material layer thereon and connected to said conveyor and effective to operate in timed relationship therewith to press a length of said fibrous material layer when said conveyor is stopped into a plate-shaped body, first rotary saw means disposed adjacent said pressing means and the loop of said conveyor including a rotary saw having a portion rotating below the feed line of said conveyor feed path in the loop opening of said conveyor and effective to move transversely through said body to trim said body after it is moved beyond said pressing means by said conveyor, and second rotary saw means arranged to move longitudinally of said conveyor to trim the longitudinal edges of said plate-shaped body.

2. A device according to claim 1, including a second conveyor disposed adjacent said first conveyor in a location to receive said cakes therefrom, means to direct supporting plates onto said second conveyor at a location to receive each of said bodies on a corresponding supporting plate, and second pressing means associated with said second conveyor located to receive said supporting plates and said bodies and to press each one as it is delivered by said conveyor.

3. A device according to claim 2, wherein said means to direct a supporting plate onto said second conveyor includes pneumatic lifting means including suction effective on the top base of said supporting plate.

References Cited in the file of this patent

UNITED STATES PATENTS

| | | |
|---|---|---|
| 2,028,616 | Loetscher | Jan. 21, 1936 |
| 2,165,280 | Lannan | July 11, 1939 |
| 2,673,370 | Goss | Mar. 30, 1954 |
| 2,698,271 | Clark | Dec. 28, 1954 |
| 2,743,758 | Uschmann | May 1, 1956 |
| 2,744,045 | Collins | May 1, 1956 |
| 2,783,837 | Bridges et al. | Mar. 5, 1957 |
| 2,878,728 | Clark | Mar. 24, 1959 |
| 2,923,030 | Himmelheber et al. | Feb. 2, 1960 |